(12) United States Patent
Cohen

(10) Patent No.: US 6,225,862 B1
(45) Date of Patent: May 1, 2001

(54) SERIES RESONANT CIRCUIT WITH INHERENT SHORT CIRCUIT PROTECTION

(75) Inventor: Isaac Cohen, Dix Hills, NY (US)

(73) Assignee: Lamda Electronics Inc., Melville, NY (US)

( * ) Notice: Subject to any disclaimer, the term of this patent is extended or adjusted under 35 U.S.C. 154(b) by 0 days.

(21) Appl. No.: 09/300,928

(22) Filed: Apr. 28, 1999

Related U.S. Application Data
(60) Provisional application No. 60/108,434, filed on Nov. 13, 1998.

(51) Int. Cl.[7] .................................................. H03K 7/162
(52) U.S. Cl. ............................ 327/589; 327/390; 326/88
(58) Field of Search ...................... 327/589, 536, 327/390, 330; 326/88

(56) References Cited

U.S. PATENT DOCUMENTS

| | | | |
|---|---|---|---|
| 3,851,182 | * 11/1974 | Wallace | 363/143 |
| 4,780,805 | * 10/1988 | Chewuk et al. | 363/142 |
| 5,047,913 | * 9/1991 | De Doncker et al. | 363/95 |
| 5,119,283 | * 6/1992 | Steigerwald et al. | 363/37 |
| 5,134,344 | * 7/1992 | Vos et al. | 315/239 |
| 5,898,278 | * 4/1999 | Muessli | 315/209 |

* cited by examiner

*Primary Examiner*—Kenneth B. Wells
*Assistant Examiner*—An T. Luu

(57) ABSTRACT

A series resonant circuit includes a series connected power source, inductor and capacitance. The resonant capacitance includes two separate capacitors, connected to form a voltage doubler. Two rectifiers clamp the resonant capacitors' voltage to the output voltage, so the voltage on the resonant capacitors is limited under overload conditions. Current control may be achieved by modulation of the power source frequency.

23 Claims, 1 Drawing Sheet

SERIES RESONANT CIRCUIT WITH INHERENT SHORT CIRCUIT PROTECTION

CROSS-REFERENCE TO RELATED APPLICATIONS

This patent application is related to co-pending U.S. Provisional Patent Application "Series Resonant Circuit with Inherent Short Circuit Protection" filed on Nov. 13, 1998, Ser. No. 60/108,434, which is hereby incorporated by reference herein in its entirety.

BACKGROUND OF THE INVENTION

Series resonant circuits are widely used in conjunction with electronic switching devices to perform DC/DC power conversion.

Such circuits are generally called "series resonant converters" and are susceptible to destruction in case of overloads or short circuits, particularly when operating at their resonant frequency.

SUMMARY OF THE INVENTION

To summarize, according to the present invention, a series resonant circuit including a power source, an inductor and a capacitance is provided. The resonant capacitance includes two capacitors, connected to form a voltage doubler.

Two rectifiers clamp the resonant capacitors' voltage to the output voltage, so the voltage on the resonant capacitors is limited under overload conditions.

Under a short circuit, the amplitude of the voltage on the resonant capacitors is zero. The capacitors are effectively eliminated from the circuit and the output current is limited to a value determined by the input voltage, switching frequency and the resonant inductor. Thus, short circuit protection is achieved.

Briefly described, in a first aspect, the present invention includes a voltage doubler circuit which has an input and a pair of series circuits connected across first and second nodes of the input. Each series circuit includes a series connected first rectifier and capacitor. Second rectifiers are connected across each of the capacitors in the first series circuits.

As an enhancement, the first rectifiers may be of opposite polarity with respect to each other. Further, the second rectifier of each series circuit may be of opposite polarity to its corresponding first rectifier within the series circuit. As an example, the rectifiers may be diodes.

As further enhancements, each of the capacitors of the pair of series circuits is connected to the first node of the input, while each of the first rectifiers is connected to the second node of the input. The output of the circuit may be taken between the junctions of the capacitor and first rectifier within each series circuit.

The circuit of the present invention may include a filter capacitor across its output and may be used in combination with, for example, an alternating current power source and an inductor in series with it.

According to further aspects and enhancements of the present invention, the power supply may operate at substantially the resonant frequency of the circuit. The frequency of the power supply may also be varied to achieve different results. For example, a current passing through the circuit may be monitored, and the frequency may be varied in accordance with the monitored current to achieve a desired output current.

BRIEF DESCRIPTION OF THE DRAWING

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawing in which

DETAILED DESCRIPTION OF A PREFERRED EMBODIMENT

Figure 1:
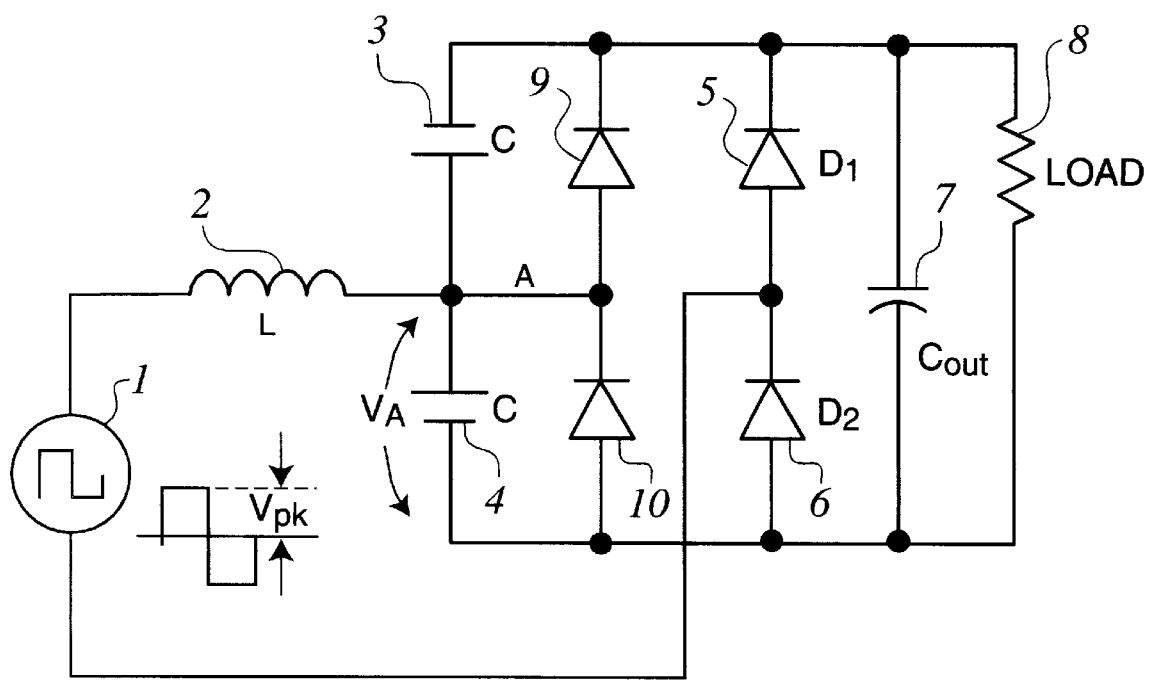
FIG. 1 depicts a circuit pursuant to an example embodiment of the present invention.

Turning to the circuit depicted in FIG. 1, a square wave voltage source 1 (the square wave being considered an alternating current signal) is connected to a series resonant circuit that includes inductor 2, capacitors 3 and 4, rectifiers 5 and 6, and output filter capacitor 7. This circuit drives a load 8. The square wave source is assumed to be generated by an inverter and will have a frequency substantially equal to the resonant frequency of the circuit consisting of inductor 2 and the two capacitors 3 and 4 in parallel:

$$F_{SW} = \frac{1}{2\pi\sqrt{L \cdot 2C}} \text{ or } T_{SW} = 2\pi\sqrt{L \cdot 2C} \quad (1)$$

It is apparent by inspection that under these conditions and in absence of a load across capacitor 7, the voltage on capacitor 7 ($V_{COUT}$) will equal twice the peak value of the input square wave ($V_{pk}$):

$$V_{COUT} = 2 \cdot V_{pk} \quad (2)$$

If a load 8 is now applied across the output filter capacitor 7, a sinusoidal current will be supplied by the input source 1. This current will be rectified by diodes 5 and 6 and the rectified (average) value will be equal to twice the current absorbed by the load. The sinusoidal current flowing through inductor 2 and into the junction of capacitors 3 and 4 will develop a sinusoidal voltage across the capacitors.

The amplitude of this voltage will be proportional to the load current and is given by ($V_A$ is the voltage at node A in FIG. 1):

$$V_A = \frac{2 \cdot I_{LOAD} \, T_{SW} \cdot 0.5}{2C} \quad (3)$$

By substituting $T_{sw}$ $$V_A = I_{LOAD} \cdot 2\pi \cdot \sqrt{\frac{L}{2C}} \quad (4)$$

It is apparent from (4) that increasing the load current will cause the voltage across capacitors 3 and 4 to increase proportionally, until the voltage rating of the capacitors is exceeded and failure occurs.

By adding diodes 9 and 10, the voltage across the capacitors is limited to a value equal to the output voltage:

$$V_{A(max)} = V_o = 2V_{pk} \quad (5)$$

This voltage value will be attained when the load current will be:

$$I_{LOAD}(1) = \frac{Vpk}{\pi\sqrt{\dfrac{L}{2C}}} \tag{6}$$

We define $I_{LOAD(1)}$ as the full-load current of the converter. If the load resistance is reduced further, the output voltage (and with it, the voltage across the resonant capacitors) will increase, reaching its maximum value when the output of the converter is shorted:

$$I_{SC} = Vpk \cdot \frac{\pi}{4 \cdot \sqrt{\dfrac{L}{2C}}} \tag{7}$$

We define $I_{sc}$ as the "natural" short circuit current of the converter.

The natural short circuit current is higher than the full load current of the converter by a factor of only $\pi^2/4$ or approximately 2.4 times, so the converter of the present invention can be operated without an active (closed loop) overload/short circuit protection. Such a circuit can always be added to limit the current to any desired value.

For instance, the current in the resonant inductor 2 can be monitored by direct or indirect means and the frequency of the input source 1 can be modulated (above or below) the resonant frequency so the value and shape yield the desired output current.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

What is claimed is:

1. A circuit comprising:
   a power input;
   an inductor, and
   a voltage doubler circuit in series with said power input and said inductor, said voltage doubler circuit comprising:
   an input having first and second nodes;
   a pair of series circuits each connected across said input, each of said pair of series circuits including a series connected first rectifier and a capacitor; and
   each of said capacitors having a second rectifier directly connected thereacross.

2. The circuit of claim 1, wherein said first rectifiers are of opposite polarity with respect to each other.

3. The circuit of claim 2, wherein said first and second rectifiers are of opposite polarities with respect to each other within each series circuit of said pair of series circuits.

4. The circuit of claim 3, wherein said first and second rectifiers comprise diodes.

5. The circuit of claim 3, wherein each of said series circuits includes said capacitors each having a node connected to said first node of said input, and said first rectifiers each having a node connected to said second node of said input, each series circuit having its capacitor and first rectifier connected at a center node within said series circuit.

6. The circuit of claim 5, further including an output across said center nodes of said pair of series circuits.

7. The circuit of claim 6, further including a filter capacitor across said output.

8. A circuit comprising:
   an alternating current power supply;
   an inductor; and
   a voltage doubler circuit in series with said alternating current power supply and said inductor, said voltage doubler circuit comprising:
   an input having first and second nodes,
   a pair of series circuits each connected across said input, each of said pair of series circuits including a series connected first rectifier and a capacitor; and
   each of capacitors having a second rectifier directly connected thereacross.

9. The circuit of claim 8, further comprising monitoring a current in the inductor and modulating the frequency of said alternating current power supply to achieve a desired output current.

10. The circuit of claim 9, wherein modulating the frequency of said alternating current power supply includes operating said alternating current power supply at substantially a resonant frequency of said series circuit including said alternating current power supply, said inductor and said voltage doubler circuit.

11. The circuit of claim 8, wherein said alternating current power supply is a variable frequency type.

12. The circuit of claim 8, wherein said first rectifiers are of opposite polarity with respect to each other.

13. The circuit of claim 12, wherein said first and second rectifiers are of opposite polarities with respect to each other within each series circuit of said pair of series circuits.

14. The circuit of claim 13, wherein said first and second rectifiers comprise diodes.

15. The circuit of claim 13, wherein each of said series circuits includes said capacitors each having a node connected to said first node of said input, and said first rectifiers each having a node connected to said second node of said input, each series circuit having its capacitor and first rectifier connected at a center node within said series circuit.

16. The circuit of claim 15, further including an output across said center nodes of said pair of series circuits.

17. The circuit of claim 16, further including a filter capacitor across said output.

18. The circuit of claim 8, wherein the alternating current power supply operates at substantially a resonant frequency of said series circuit including said alternating current power supply, said inductor and said voltage doubler circuit.

19. The circuit of claim 18, wherein said first rectifiers are of opposite polarity with respect to each other.

20. The circuit of claim 19, wherein said first and second rectifiers within each series circuit of said pair of series circuits are of opposite polarity with respect to each other.

21. The circuit of claim 20, wherein each of said series circuits includes said capacitors each having a node connected to said first node of said input, and said first rectifiers each having a node connected to said second node of said input, each series circuit having its capacitor and first rectifier connected at a center node within said series circuit.

22. The circuit of claim 21, further including an output across said center nodes of said pair of series circuits.

23. The circuit of claim 22, further including a filter capacitor across said output.

* * * * *